United States Patent [19]

McCole

[11] 4,019,251
[45] Apr. 26, 1977

[54] FLAT BATTERY AND METHOD OF MANUFACTURE

[75] Inventor: Thomas P. McCole, South Natick, Mass.

[73] Assignee: Polaroid Corporation, Cambridge, Mass.

[22] Filed: Jan. 8, 1976

[21] Appl. No.: 647,599

[52] U.S. Cl. .............................. 29/623.2; 29/623.3
[51] Int. Cl.² .......................................... H01M 6/00
[58] Field of Search .......... 136/111, 175; 29/623.3, 29/623.2

[56] References Cited

UNITED STATES PATENTS

| | | |
|---|---|---|
| 3,734,780 | 5/1973 | Belhorn et al. ..................... 136/111 |
| 3,775,188 | 11/1973 | Oltman et al. ..................... 136/175 |
| 3,907,599 | 9/1975 | Fanciullo et al. .................. 136/111 |

Primary Examiner—Donald L. Walton

Attorney, Agent, or Firm—Stanley H. Mervis; John W. Ericson

[57] ABSTRACT

A method for constructing flat batteries having improved peripheral seals. These batteries are characterized in incorporating polymeric intercell connectors, outer collector assemblies including an externally disposed sheet terminal-current collector and sheet separator components associated with thermal sealing material, the peripheries of the seal material extending outwardly from the corresponding peripheries of the current collectors and intercell connectors. To effect a seal of improved integrity as well as enlarged size, a cover sheet of material dimensionally stable at temperatures whereat the seal material and the polymeric connectors are dimensionally unstable is placed over the current collector and seal portions with which a thermal sealing bar would otherwise come in contact.

23 Claims, 8 Drawing Figures

FLAT BATTERY AND METHOD OF MANUFACTURE

BACKGROUND

The development of thin, compact and highly automated cameras as described, for instance, in U.S. Pat. Nos. 3,750,551; 3,774,385; 3,731,608; and 3,714,879 has been seen to have generated a concomitant need for a flat and compact battery source of power capable of operating a variety of electrical control instrumentalities having somewhat specialized power requirements. For instance, the battery must have a relatively high current output capacity for powering a motor driven film processing and reflex optics cocking assembly as well as electrically automated shutters incorporating electromagnetic drive devices and the like. Inasmuch as these instrumentalities are regulated by logic circuitry, requisite voltage levels must be sustained by the batteries during the noted current drains. A flat multicellular pile structure is particularly suited for providing a requisite low internal impedance battery. As described in U.S. Pat. No. 3,543,662, preferably, the thin battery is mounted within a film cassette assemblage and takes the shape of one film unit thereof. In consequence of this combined battery power supply-film supply arrangement, the compactness and thinness of a resultant foldable camera may be optimized.

For practical utilization in combination with a photographic film product, for instance, to form the composite cassette assembly described above, the thin batteries must not only be amenable to economic high volume production techniques, but also must exhibit a very high reliability. Such reliability is mandatory inasmuch as the batteries are packaged as an integral part of the film cassette assemblage and any dysfunctions on the part of the battery component thereof well may result in the wasting of the entire film cassette or pack.

To achieve requisite low unit costs inproducing such thin batteries, the industry heretofore has looked to techniques as described in U.S. Pat. No. 3,708,349, wherein wide, continuous and multizoned webs of the sheet type components of the batteries or piles are manipulated along a production line to somewhat simultaneously form a plurality of cells and composites thereof. Following deposition of substantially all electrochemically active materials upon the wide web, select portions thereof are slit and sheared and manipulated into registry and, ultimately sealed and sheared transversely of web movement ot form discrete battery units. These discrete units then are packaged as a component of film cassette assemblages whereupon they are forwarded to retail distribution channels.

When such multizone, wide web-type high volume production battery assembly techniques are utilized, it is necessary that electrically conductive web-type components of the battery pile structures serve as carriers within the assembly system. For instance, electrically conductive materials such as metal and/or carbon impregnated polymeric sheet are utilized respectively as external current collectors and electrode supporting intercell connectors. When employed within a multizone wide web production scheme, these webtype conductive materials are combined with electrochemically active materials thus forming coupled active cell structures which may develop voltage phenomena along the production line. Such voltages may have the effect of derogating from battery performance. Further, the battery structures necessarily evolved from this form of wide-web assembly require a shearing of superposed conductive and insulative layers to evolve discrete battery structures. This inherently results in a flat battery geometry wherein the edges of adjacent conductive sheets and of intermediately disposed insulating separator-seal structures are arranged in vertical alignment. In carrying out thermal peripheral sealing of such structures, considerable care must be taken to avoid disturbing the laminar peripheral edges. In the absence of such care, adjacent electrically conductive sheet components may flow under heat and pressure to edge short the structure. To avoid such effects, heat-pressure operations are carried out inwardly a select distance from the peripheries from the battery structures. This practive carries the distinct disadvantage of reducing the effective area of the edge seals, the quality of such seals being of considerable importance to battery reliability as well as to achieving to accetable manufacturing yields.

Proper performance of the seals within flat batteries represents a critical aspect of their utility. For instance, the flat batteries at hand are not compressively packages in containers as is typical with batteries manufactured heretofore. To provide requisite flatness, the peripheral extent of the batteries requiring sealed integrity is much larger than conventional container structured batteries. The seals now contemplated must be continuous about the entire periphery of the batteries and must operate to retain adequate moisture within the electrochemical environment of the batteries and exclude environmental gases such as oxygen and the like. Further, it is desirable that seals provide a modicum of outgassing of effluvia generated within the battery, for instance, hydrogen in a LeClanche system.

Another technique for fabricating the above-described flat batteries provides for multicell pile buildup upon a continuous then, sheet-type electrically insulative carrier. Described in detail in copending application for U.S. Pat. Ser. No. 478,106, by L. Bruneau, entitled Flat Battery and Manufacture Thereof, filed June 10, 1974, and assigned in common herewith, through the use of this discrete placement fabrication technique separator or seal elements for the batteries can be dimensioned so as to extend beyond the electrically conductive polymeric sheet components defining each cell. As a consequence, the occasion for the occurrence of edge shorting effects and the like during manufacture are greatly diminished and consequent manufacturing yields are improved. For any of the above-described techniques of manufacture however, edge sealing using heat and pressure necessarily result in a diminution of seal area. For instance, the metallic externally disposed current collector and terminal sheets of the structures necessarily warp under heat and pressure effects often occasioning a displayed formation or geometry of components about the battery peripheries. These effects are encourgaged by a heretofore necessary sealing procedure wherein sealing or contact with each multicell battery unit during fabrication is limited to a zone residing inboard of the outer peripheral edges of the entire battery structure.

SUMMARY OF THE INVENTION

The present invention is addressed to an improved method for constructing flat batteries wherein the peripheral seal provided each battery exhibits an enhanced intercomponent lamination or seal integrity and wherein the extent of the peripheral seal advantageously is expanded. This improved method is characterized in the utilization of a cover sheet of material and polymeric connector materials are dimensionally unstable. This cover sheet is interposed between a fully built up battery pile structure and thermal and pressure sealing device prior to the sealing operation of the manufacturing method. This cover sheet is characterized by conducting transversely but not laterally, thereby permitting greater control of the actual seal width and the use of a wider seal, as discussed in more detail below. By dimensioning the cover sheet so as to extend over all seal configurations as well as the metallic surface of a collector assembly otherwise contacted by the thermal sealing elements, the rebound or memory effects of the metal components are somewhat restrained to avoid delamination effects occasioned with such sealing procedures.

In a preferred embodiment, the improved method for fabricating the batteries is provided in conjunction with the discrete flat cell buildup described in detail in the above-noted U.S. application Ser. No. 478,106. For instance, the multicell batteries are formed by assembling a predetermined sequence of discrete-type components, electrolyte and electrode active materials to defined a multicell pile. These components include current collectors which are externally disposed within each battery assemblage as well as electrically conductive polymeric intercell connectors and dye impermeable but insulative separator sheets. These components are associated with a thermally activatable material seal which is peripherally disposed about the corresponding peripheries of each cell unit within the multicell assembly. Prior to introducing the assembled or compiled multicell structures to a sealing station, the noted cover sheet material is applied over the surface upon which seal contact is made and heat and pressure then are applied against the cover sheet to effect final sealing. In a preferred embodiment, the method includes a final step of cold striking or the like wherein a cool platen acting as a heat sink is applied against the seal to effect a permanent set in the sealing material. Additionally, an adhesive may be provided intermediate the noted cover sheet and that component of the batteries with which it comes in contact prior to the heat-sealing procedure. In the preferred embodiment of the invention the cover sheet material is glassine, a thin, hard and almost transparent paper made from well-beaten chemical wood pulp.

Other objects of the invention will in part be obvious and will in part appear hereinafter.

The invention accordingly comprises the method possessing the combination of elements and steps which are exemplified in the following detail disclosure.

For a fuller understanding of the nature and objects of the invention, reference should be had to the following detailed description taken in conjunction with the accompanying drawings.

DETAILED DESCRIPTION

Figure 1:
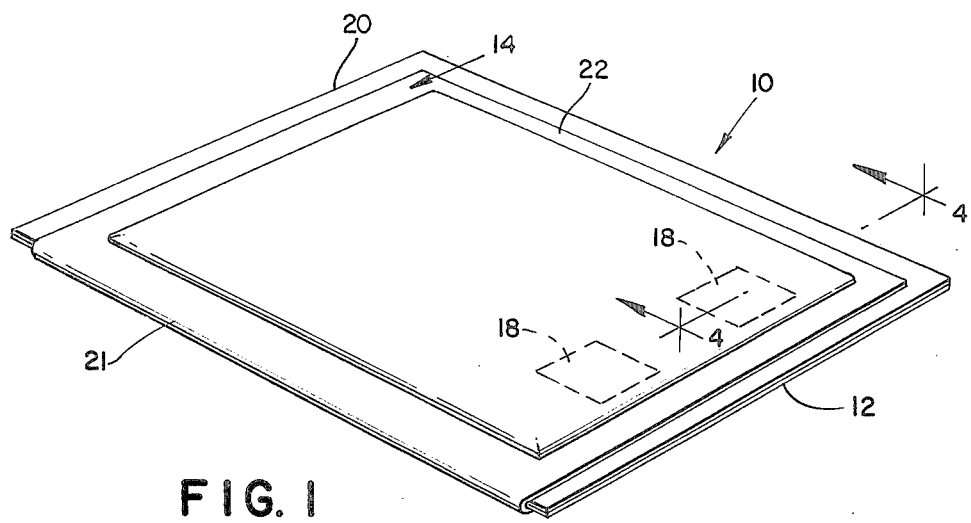
FIG. 1 is a perspective view of a flat battery structure fabricated according to the invention as it exists prior to packaging.

A multicell flat battery structure is presented generally at 10 in FIG. 1 as it would appear in an electrochemically active state following component build-up and sealing in accordance with the method of the instant invention. Certain of the features of the invention will appear from an examination of this perspective view. Note, for instance, the presence of an electrically insulative sheet 12 located at the bottom of the pile structure. The length of insulative sheet 12 as well as its widthwise dimension are selected such that it extends slightly beyond the peripheries of the electrically active separator and seal components of battery 10. The upwardly facing surface of battery 10 is present as the outer metal surface of an anode electrode current collector assembly 14. The electrode current collector assembly 14 is folded about one side of battery structure 10 to present a downwardly facing metallic surface portion as at 16 which is utilized to provide a terminal defining surface for the battery. An opening shown in dashed fashion at 18 and formed in insulative sheet 12 provides acess to the downwardly facing metal surface of a cathode electrode collector assembly (shown in FIG. 4) which is attached to the upward facing surface of sheet 12. With the arrangement, cathode and anode terminals may be provided in convenient adjacency on one flat surface of the battery structure 10. Also revealed in FIG. 1 are the peripheral, seal material impregnated, edges of electrically insulative separator elements 20. Extending over the uppermost surface of collector assembly 14 as well as the protruding edges of seal materail impregnated separator elements 20 and any exposed portions of carrier sheet 12 is a cover sheet 21 of, for instance, glassine which is adhesively applied to the battery structure at the sealing operation. The slightly depressed peripheral portion 22 of the assembly is occasioned from peripheral sealing procedures provided in the course of assembly of the structure 10. This depression necessarily becomes more exaggerated in the sectional views of the battery.

Looking now to FIGS. 2, 3, 4, 5, and 6, the structure of battery 10 is revealed in more detail and the method for fabricating it according to the invention is shown. The preferred production technique is typified in the utilization of an electrically insulative sheet or web-type carrier ultimately serving as the above-described sheet 12. Sheet 12 may be drawn from a suitable roll-type supply 24 and introduced to a fabricating industrial line through appropriate web drives (not shown) including tension adjusting rolls as at 26 and 28. Web 12 preferably is introduced having a width selected to achieve the geometry described in connection with battery 10 of FIG. 1. Accordingly, its width is selected as being slightly greater than the electrically active components of the battery structure or at least as wide as separator components 20. Materials selected for the web, in addition to being electrically insulative, should be chemically inert and may be a plastic material, for instance, a film of an organic polymer which is capable of being heat sealed. Suitable such materials are "Mylar", a product of E. I. DuPont de Nemours and Co. or "Estar", a product of Eastman Kodak, Inc. which is a film of polyethylene terephthalate or an unfilled polyvinyl chloride or the like. Preferably, cardboard is utilized as the carrier by virtue of its resistance to stretching effects and the like. For photographic applications as described in the above-referenced U.S. Pat. No. 3,543,662, sheet or web 12 may be coated with a substance opaque to actinic radiation incident thereon to aid in maintaining the lighttight integrity of any film container within which the batteries are incorporated. A black "Mexican lacquer" coating is found to be suitable for this purpose.

Figure 3:
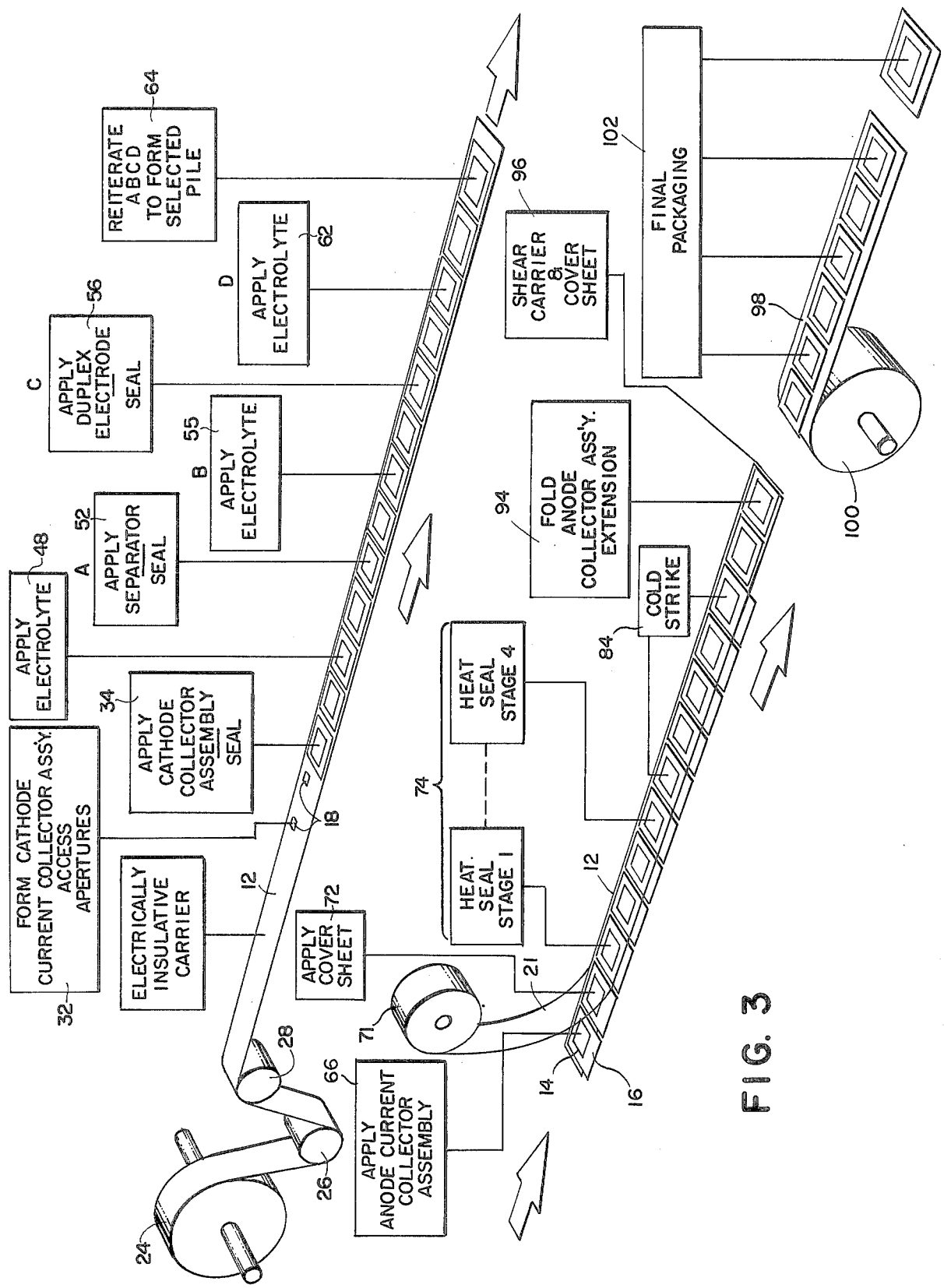
FIG. 3 is a schematic diagram showing, in block fashion, the functions of fabricating stations along an assembly line producing batteries in accordance with the invention.
Figure 5:
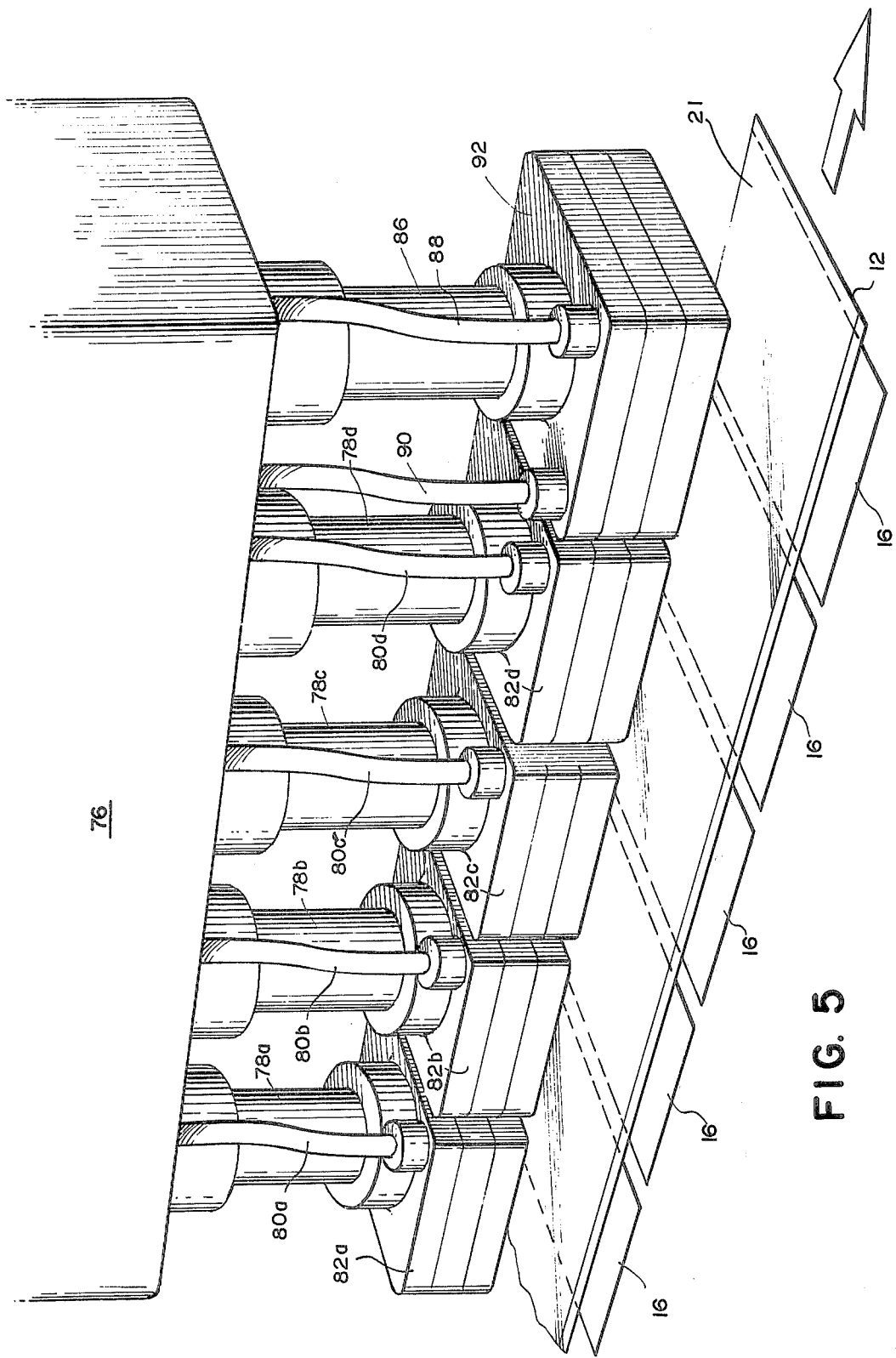
FIG. 5 is a pictorial representation of a sealing station utilized in the method of the invention.

Web or carrier 12 is manuvered through the production or assembly area with an intermittent motion in accordance with the spacing of individual multicell battery or pile assemblies which are made thereon. As shown in FIG. 3, the initial pitch or spacing between the battery units on the carrier web is established by the formation of substantially reqularly spaced access apertures 18 as revealed at station or function block 32. By photo-detecting and edge of these apertures 18, suitable spacing and registration controls may be provided throughout all of the assembly stations of the production line. While openings 18 may take a variety of shapes, a convenient arrangement is an opening having a rectangular periphery formed toward one side of web 12 in a position such that a terminal defining surface is in position for appropriate contact with the instrumentalities within which the battery is utilized as a power source.

As revealed at station function block 34 in FIG. 3, the component build-up upon web 12 is commenced by positioning a discrete cathode current collector assembly 36 in appropriate registry over access opening 18. Assembly 36 is a discrete laminar structure including a metallic sheet or foil current collector 38 (FIG. 4), preferably an annealed tin coated steel or an aluminum or lead sheet material on the order of less than 10 mils in thickness, which is laminated to a polymeric current collector 40. Collector 40, in turn, preferably is a sheet of electrically conductive carbon-impregnated vinyl film sold under the trade designation "Condulon" having a thickness in the order of about 2 mils and configured having the same relative external or peripheral dimensions as metal surface 38. Predeposited over film surface 40 is now dry active positive material 42. Cathode 42 is positioned inwardly from the periphery of collector 40 to provide clear surfaces for subsequent sealing procedures and, for providing a LeClanche electrochemical system, may be present as a mixture of manganese dioxide (depolarizer) and electrically conductive carbon dispersed in a polymeric binder. Of course, the battery structure may be designed to utilize any of a variety of known positive electrode materials such as other inorganic metal oxides, for instance, lead oxide, nickel oxyhydroxide, mercuric oxide, and silver oxide, inorganic metal halides such as silver chloride and lead chloride and organic materials capable of being reduced such as dinitrobenzene and azodicarbonamide compounds.

When the preformed laminar collector assembly 36 is positioned as by "pick-and-place" technique common in the art, portions of the periphery of web 12 will extend beyond the widthwise periphery of the assembly to provide a geometry facilitating the insulation thereof. The peripheral area of assembly 36 is heat sealed to web 12 following its placement. As revealed at station function block 48 in FIG. 3, web 12 is driven to carry the subassembly including current collector assembly 36 to a position where electrolyte is applied coextensive the facing surface of cathode material 42. Represented in FIG. 4 at 50a, the electrolyte ordinarily will comprise a conventional aqueous solution of ammonium chloride/zinc chloride containing a polymeric binder such as hydroxyethyl cellulose, etc., for example on the other of about three weight percent (3%) or more. In addition, a small quantity of mercuric chloride may be present in the electrolyte as a corrosion inhibitor. Preferably, the electrolyte is deposited over cathode 42 utilizing positive displacement techniques as opposed to doctoring, silk screening and the like.

As revealed at function block 52, the next station in the assembly procedure aplies a discrete electrically insulative searator element 20a. As is more clearly illustrated in FIGS. 2 and 4 and as has been generally discussed in connection with the separator peripheral portions 20 in FIG. 1, separator 20a is formed having a rectangularly shaped periphery which extends slightly but importantly beyond all electrochemically active components of the battery. Note in this regard, that the noted separator element extends slightly beyond the periphery of cathode current collector assembly 36. Component 20a as well as all separators within a pile structure may be constructed of and comprise a conventional battery separator material such as aqueous electrolyte permeable fibrous sheet materials, for example, fibrous and cellulosic materials, woven or nonwoven fibrous materials such as polyester, nylon, polypropylene, polyethylene or glass. A pheripheral, frame-shaped portion of each separator, as at 41a, is impregnated with a thermally activatable electrically insulative seal or adhesive such as a polymeric hot melt adhesive, for example, a conventional hot melt vinyl adhesive suited to secure each separator with contiguous anode and cathode carrier sheets, such as polymeric current collector sheet 40. One seal material found useful in the instant process is a commercially available fatty polyamide produced under the trade name VERSALON, General Mills, Inc. Note that sealing periphery 41a is positioned outwardly from the area of influence of electrolyte gel 50a. Following appropriate placement of discrete separator element 20a, its peripheral portion 41a is thermally sealed to the subassembly including carrier sheet 12 and collector assembly 36, a thermally induced bond being available between sealant 41a and the noted polymeric current collector sheet 40. This thermal sealing step is a preliminary one providing a "tacking" of the separator component to the polymeric surface beneath it. Such sealing may be carrier out, for instance, by utilizing small jets of heated air directed upon the upwardly facing surface of the seal impregnated portion of the separator for a relatively short interval of time. Such tack sealing is utilized throughout compilation of the multicell to retain the components thereof in appropriate registry during the assembly process.

As is represented at function block 55 in FIG. 3, the pile subassembly now moves to a second station for the application of electrolyte. Identified in FIG. 4 at 50b, this second electrolyte application is made over the central portion of separator 20a within the porous area thereof not incorporating sealant 41a. With this electrolyte application, a continuous electrolytic association between the cathode 42a and a next adjacent anode may be effected.

The associated anode for the initial cell is provided, as shown at function block 56 in FIG. 3, with the positioning over the subassembly of a discrete duplex electrode 58a. Serving as an intercell connector, duplex electrode 58a may be prefabricated of a sheet or film of electrically conducting material, preferably a sheet of electrically conductive carbon impregnated vinyl which, as described earlier, in connection with layer 40 may be "Condulon" or the like. Materials for the intercell connectors should be impervious to the electrolyte utilized within the cell structure, must provide a function for conducting electrical current between the positive electrode in one cell and the negative electrode in th next cell, should not create undesired electrochemical reactions with the electrodes or other components of the battery and should be sealable with seal materials within regions 41a-41d of the separators. Preformed centrally upon the lowest side of the conductive sheet is a distribution of active zinc negative or anode material 60a which, in conventional fashion, is amalgamated with, for instance, mercury by contact with mercuric chloride within the electrolyte of the cell. Oppositely disposed upon the conductive sheet of the duplex intercell connector 58a is another dry deposition of active positive material 42b which is present, for instance, as a manganese dioxide/electrically conductive carbon mixture dispersd in a polymeric binder as described earlier. The electrically conductive sheet forming the duplex electrode 58a is configured in discrete fashion having a peripheral dimension corresponding with that of cathode current collector assembly 36. As such, it may be observed in FIG. 4 that separator 20a will extend beyond the periphery of electrode 58a. Following its positioning, the duplex electrode sheet is "tack" sealed about its outer periphery to the sealant 41a of earlier positioned separator 20a. As a consequence, the first electro-chemically active cell of the pile structure will have been assembled. Note at this juncture, that the active cell is carried by an electrically insulative and chemically inert carrier web 12 in regularly spaced relationship and separated from other multicell components such that no delecterious voltage phenomena or the like will commence to be created along the production or assembly line.

Figure 4:
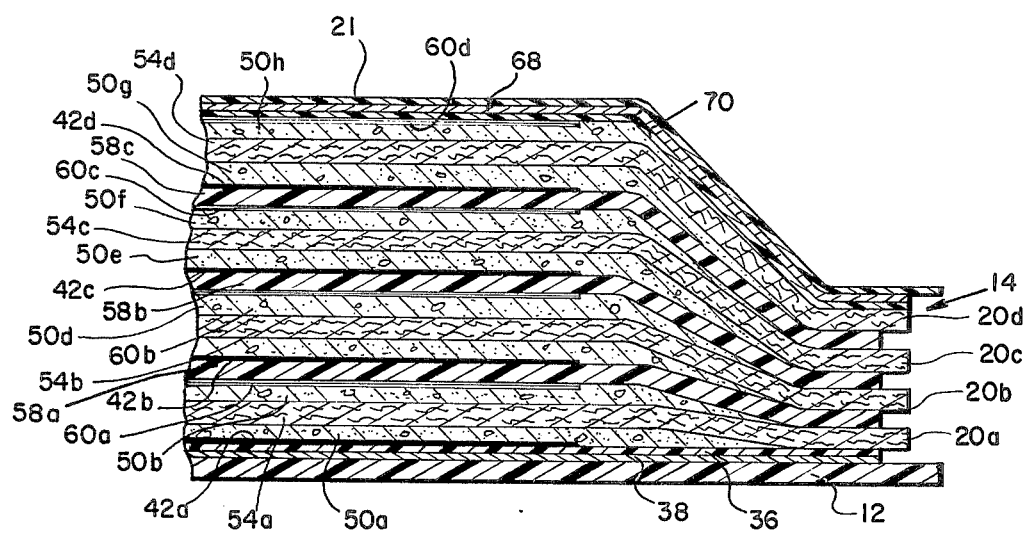
FIG. 4 is a sectional view of a battery structure according to the invention taken through the plane 4—4 of FIG. 1.

As is revealed at function block 62 in FIG. 3, the unit cell subassembly is moved by carrier 12 to a station applying electrolyte as identified in FIG. 4 at 50c. This deposition in combination with cathode material 42b commences the build-up of the next serially coupled contiguous cell. Accordingly, the above-described sequence of construction may be reiterated as shown at block 64 of FIG. 3 by select repetition of series of station procedures employed in connection with blocks 52, 55, 56, and 62. Note in this regard, that these blocks, respectively, have been labeled "A", "B", "C", and "D", and identified in that sequence in block 64. In each reiteration the dimensional configurations of the discrete elements remain identical as well as their poositioning in registration to achieve a requisite laminar structure. Turning to FIG. 4, note that a four cell pile structure is illustrated as including separators 20a-20d, electrolyte depositions 50a-50h, duplex intercell connector elements 58a-58c, cathode electrode depositions 42a-42b, and anode depositions 60a-60d.

Figure 2:
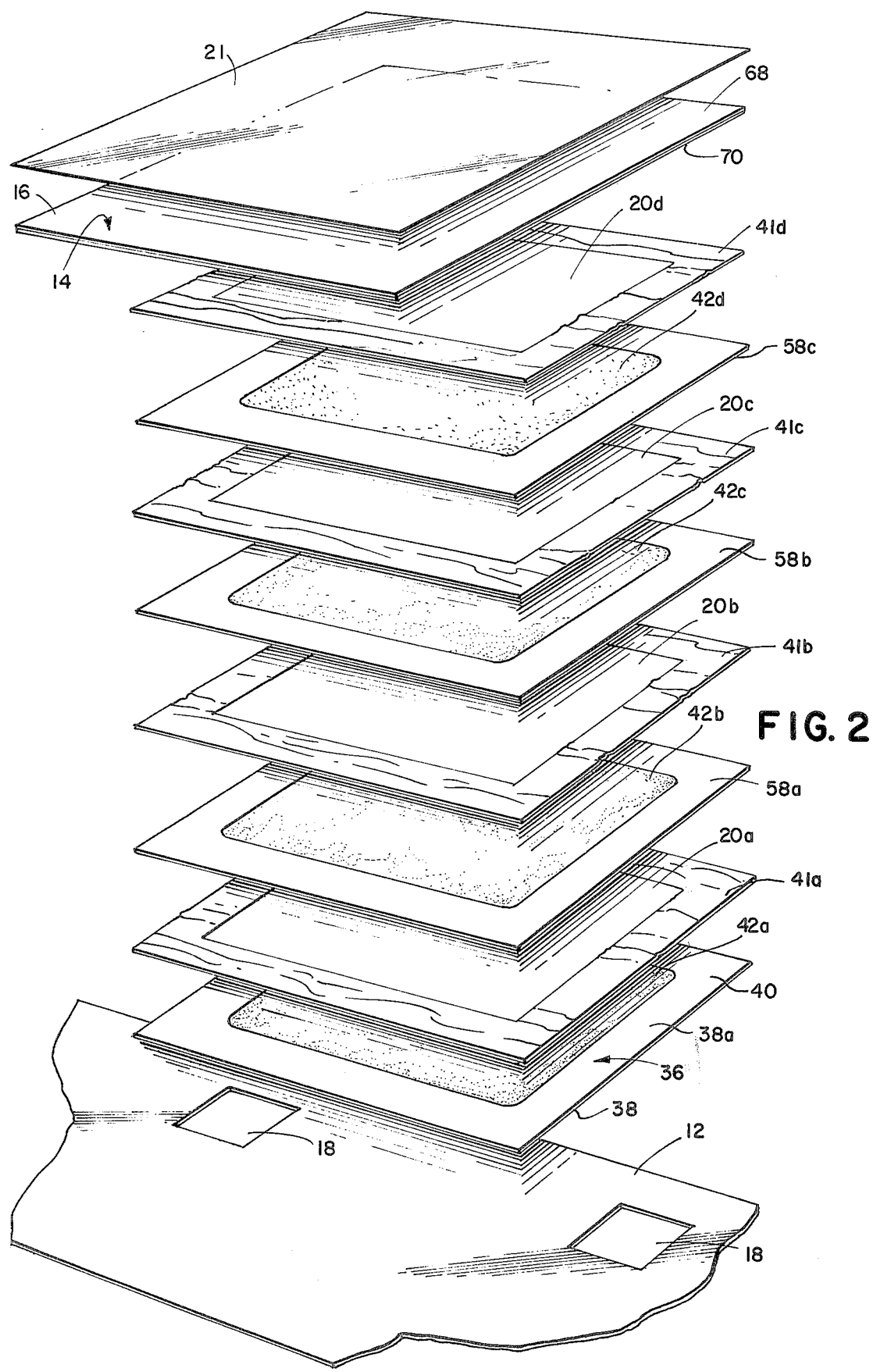
FIG. 2 is an exploded perspective representation of the components of a batterry structure formed according to the invention revealing the relative orientation of sheet type components thereof.

Following the final electrolyte deposition 50h (FIG. 4), the multicell subassembly is moved by web 12 to a station applying a discrete anode current collector assembly as shwn in FIG. 3 at block 66. Identified at 14 in FIG. 3, and illustrated in more detail in FIGS. 2 and 4, assembly 14 is configured in similar laminar fashion as earlier described assembly 36. In this regard, assembly 14 is constructed having a metallic sheet terminal surface portion preferably formed of annealed tin coated steel sheet material on the order of less than 10 mils in thickness, as shown at 68, in laminar electrical and physical bond with a polymeric current collector sheet of electrically conductive carbon impregnated vinyl film 70. Sheets 68 and 70 are coextensive in dimension, however, such dimension is extended, as previously described at 16, to a widthwise dimension protruding beyond the adjacent edge of carrier web 12. Centered within that portion of assembly 14 excluding extension 16 is active zinc negative material 60d predeposited thereupon in similar fashion as provided at anode deposits 60a-60c. Upon being positioned as shown in FIG. 2, the multicell pile subassembly is moved to station 72 wherein the earlier described cover sheet 21 is applied in continuous fashion from a roll supply as at 71. Material 21 is selected as being dimensionally stable at temperatures wherein the seal material as at 41a-41d as well as the polymeric intercell connectors are dimensionally unstable. A preferred material, as described above, is glassine, a thin, hard, and almost transparent paper made form wellbeaten chemical wood pulp. Sheet 21, on the order of about 2 mils in thickness, has a width, as revealed in FIG. 4, which extends over the outer peripheries of separators 20a-20d and is applied in continuous fashion over collector assemblies 14 as well as the previously described spaces intermedicate each discrete pile assembly. Just prior to its placement, the sheet may be coated with an adhesive to facilitate maintaining its position during subsequent sealing stages. Any convenient adhesive may be utilized, for instance, ethylenevinyl acetate (EVA).

Cover sheet 21 is heat sealed at station 74 stage 1 following the application of cover sheet 21 at station 72, multicell subassemblies are moved into a final sealing area identified generally in FIG. 3 at 74.

Within station 74, the peripheries of the discrete components of the multicell assemblies are subjected to a series of heat-pressure sealing compilations to establish the final seal for the batteries. Multiple stage sealing is utilized to prevent excessive heat buildup whidh might otherwise adversely affect the operative quality of, for instance, the gel electrolyte depositions within each cell. In the embodiment illustrated, four heat-sealing stages are provided, a typical representation of a multistage sealing arrangement being revealed in pictorial fashion in FIG. 5. Looking to the latter figure, the upper support structure of a conventional C-frame assembly support is shown at 76 from which depend hydraulically actuated press components 78a-78d. Also extending from support 76 are coolant fluid conduits as at 80a-80d. Fixed to each of the respective press components 78a–78d and conduits 80a–80d are heated lamination blocks 82a–82d. These heated blocks are configured having an area of heat producing and pressure producing context with the seal area of each battery. Additionally, a water-cooled platen (not shown) is provided centrally of such heated laminating blocks to protect the electrochemically active components of the batteries during the sealing procedure. As each battery pile assembly is presented to successive ones of the laminating blocks 82a–82d, the latter are driven into contact with the seal areas to bring the laminar components of the batteries together at the seal periphery portions thereof and thermally activate the sealing materials. As described in connection with FIG. 1, this pressure and heat serves to deform the uppermost collector assembly 14. Without the presence of glassine cover sheet 21, the elastic memory of the metallic portions would tend to rebound into an orientation engendering a delamination of the seal defined at the separator peripheries.

Figure 6:
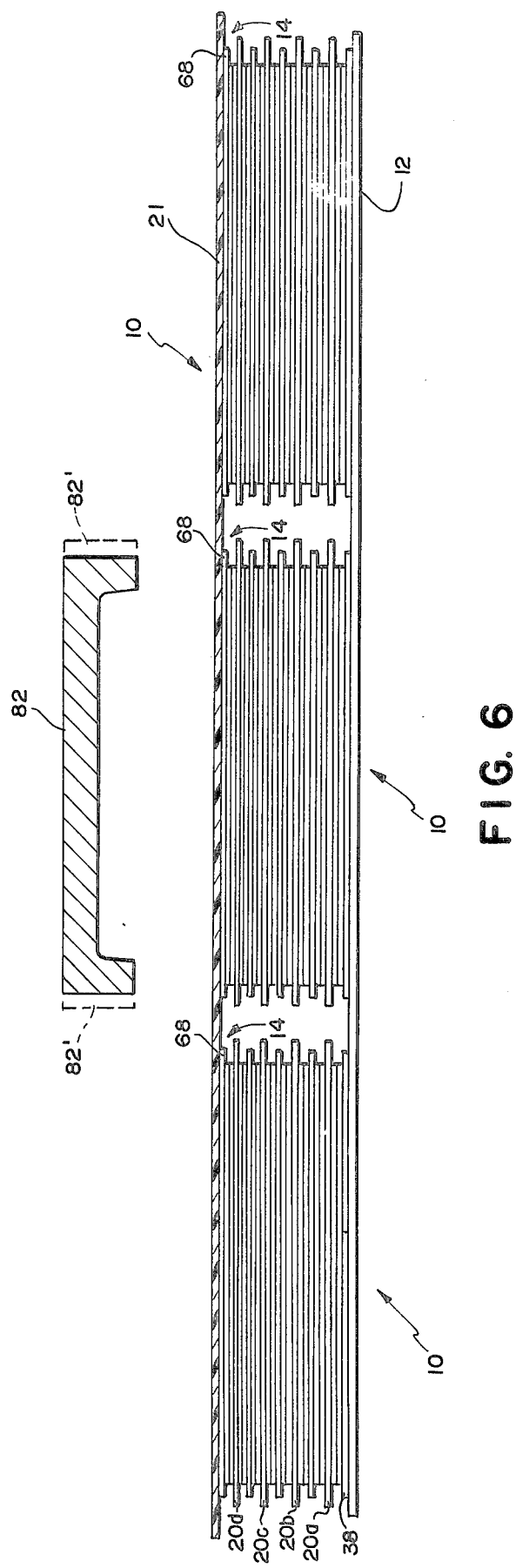
FIG. 6 is a schematic representation of components of the station of FIG. 5 showing the relative dimensioning of components within such station.

Looking additionally to the schematic portrayal of FIG. 6, a laminating or heat striking block is represented generally at 82 superposed a schematic and exaggerated drawing of an unsealed laminar pile. Block 82 is shown in solid line fashion as it is used in accordance with prior art practice. Note that the block is aligned inwardly of the periphery both of the metallic surface 68 of collector 14 as well as inboard of the periphery of the separator seal structure. With the provision of the glassine cover sheet 21 in accordance with the instant invention, however, the extent of the seal provided by block 82 may be advantageously expanded to the size represented in dotted fashion at 82'. The batteries fabricated according to the prior art generally have been formed having a seal length along the lengthwise dimension of the batteries of 3.050 inches and an outside length of 3.30 inches. With the seal technique of the invention, this length is increased in outside dimension to 3.594 inches. The inside spacing of the seals considering the widthwise orientation of the batteries for both the present and prior structures has been, for instance, 2.380 inches, the outside dimension of the steal for prior practice has been 2.630 inches to provide an all around seal width having a maximum dimension of 0.125 inches. With the sealing technique of the instance invention, the side dimension considering the widthwise orientation of the battery is increased to 2.875 inches to provide a seal width ranging from 0.247 inches to 0.272 inches. In effect, the seal width is essentially doubled.

Returning to FIGS. 3 and 5, preferably it is desirable to provide a last sealing station stage wherein the thermally sealed batteries are cold struck. With such an arrangement, the hydraulic actuating press component 86 operating in conjunction with coolant fluid conduits 88 and 90 moves laminator block 92 into contact with the seal area of the multicell batteries. However, block 92 is not heated but is cooled from lines 88 and 90 to effect a heat sink activity at the seal areas.

As revealed at block 94 in FIG. 3, following final sealing, the extension 16 of anode collector assembly 14 is folded around the edge of the multicell assembly to a position wherein surface 70 thereof abuts against the underside of web 12. As described in connection with FIG. 1, this exposes the metallic surface 68 of assembly 14 to the underside of the battery in juxtaposition to the metallic surface 38 of collector assembly 36. A select portion of the surface of metallic layer 38 is accessed through rectangular access opening 18 initially formed in web 12. The terminals of the multicell battery 10, therefore, are on one side of the battery and in conveniently spaced juxtaposition.

Looking to FIG. 4, it may be observed that no additional insulative materials are required to accommodate for the noted folding of extension 16 inasmuch as the peripheries of the separators 20a – 20c extend beyond intercell connectors 58a–58c, while the complementing peripheral edge and exposed surface of electrically insulating carrier web 12 provides insulative protection for collector assembly 36. Accordingly, the structure is simply formed, retaining a high reliability through the geometry of its component discrete elements. Web 12 then carries the battery assemblies 10 to a shearing station depicted in FIG. 3 at 96. At this point, both electrically insulative web 12 and cover sheet 21 are sheared to provide discrete battery units such as that shown in FIG. 1. As noted earlier, no electrical interconnection is formed between the web-connected multiplicity of subassemblies, therefore, no deleterious voltage phenomena along the battery assembly line are witnessed. Further, no electrically conductive material, for instance, the polymeric electrically conductive materials and metal foils are cut or sheared within an electrochemical environment on the production line. Only the electrically insulative carrier 12 and cover sheet 21 are sheared. As a consequence, edge shorting occasioned during the formation of discrete elements is substantially eliminated.

Figure 7:
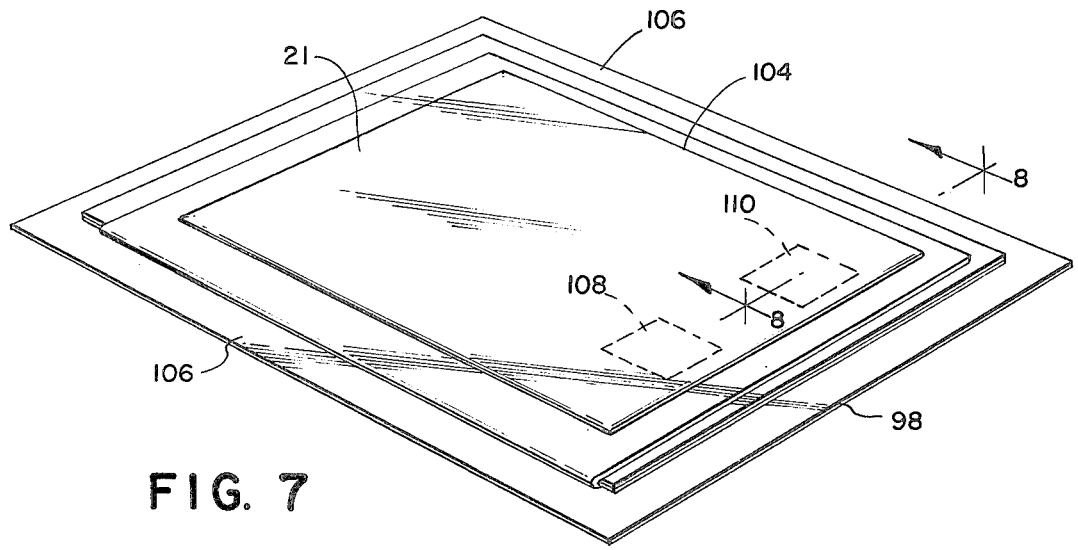
FIG. 7 is a pictorial view of the battery structure of the invention showing it following a final packaging thereof.
Figure 8:
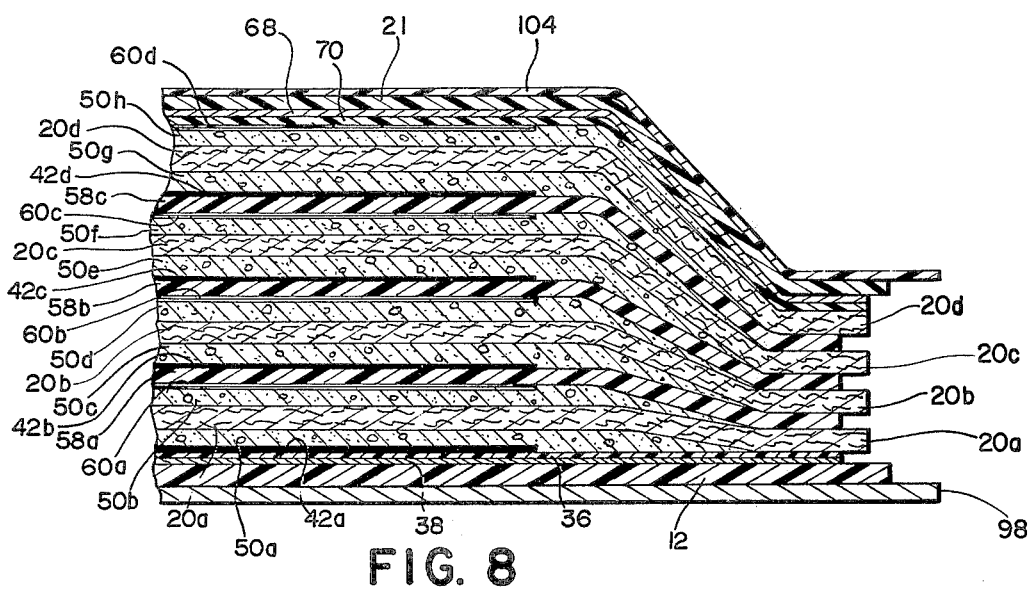
FIG. 8 is a sectional view of the structure of FIG. 7 taken through the plane 8—8 thereof.

Following shearing of web 12, and sheet 21, the discrete battery unis 10 are positioned upon a continuous carrier roll of cardboard stock 98 shown extending from a supply roll 100 in FIG. 3. Stock 98 is provided having a widthwise dimension greater than that of the completed battery assembly 10 and a upward facing surface having formed thereon a low temperature heat sealing material upon which battery assemblies 10 are positioned. As depicted generally at function block 102, final packaging of the battery units 10 may then tke place upon this insulated carrier 12. In one such packaging arrangement, the forward edge of each battery element 10 is heat sealed to the adhesive coating upon card stock 98 at the forward edge thereof through the use of a simple hot bar technique. The thus attached battery units are then moved by the continuous web card stock through a station wherein a thin electrically insulative film, e.g., polyethylene, is positioned over the card stock-battery combination in continuous fashion. This overwrap is depicted in FIGS. 7 and 8 at 104. Upon positioning of overwrap 104, the peripheral portion 106 of card stock 98 is sealed to overwrap 104, utilizing a heat sealing technique following which the card stock 98, carrying the individual battery components 10, is sheared to provide discrete packaged battery units. A finally packaged battery is shown pictorially in FIG. 7 and in cross-section in FIG. 8.

Looking to FIG. 7, two access apertures 108 and 110 are shown formed in appropriate position within card stock 98. Having a rectangular configuration, apertures 107 and 110 respectively, provide access to the outwardly facing metallic surfaces provided by wrap-around portion 16 of collector assembly 14 and surface 38 of collector assembly 36 as accessed from opening 18.

Since certain changes may be made in the above method without departing from the scope of the invention herein involved, it is intended that all matter contained in the above description or shown in the accompanying drawings shall be interpreted as illustrative and not in a limiting sense.

What is claimed is:

1. The method for constructing flat batteries comprising the steps of
    assembling a predetermined sequence of sheettype components, electrolyte and electrode active materials to define a multicell pile, said sheet-type components including current collectors externally disposed within said assemblage, electrically conductive polymeric intercell connectors and separators, said components being associated with thermaly activatable material seals peripherally and continuously disposed about the peripheries thereof and dimensioned having peripheries extending beyond the peripheries of said intercell connectors adjacent said seals;
    placing cover sheet material, dimensionally stable at temperatures whereat said seal material and said polymeric connectors are dimensionally unstable, upon one said externally disposed current collector, said cover sheet transmitting heat substantially only in a transverse direction and extending over the said peripheries of said seals; and then
    thermally sealing the periphery of said multicell pile by applying heat and pressure against said cover sheet over a peripheral area including said seal material to effect thereby a peripherally disposed seal.

2. The method of claim 1 including the step of cooling said thermal seal subsequent to said application of heat and pressure.

3. The method of claim 1 including the step of providing adhesive intermediate said cover sheet and said one externally disposed current collector.

4. The method of claim 3 wherein said adhesive is applied to one surface of said cover sheet prior to said placement thereof.

5. The method of claim 1 wherein said cover sheet material is glassine.

6. The method of claim 1 wherein the said thermally activatable material of said seals is preimpregnated within a select peripheral portion of each said sheet-type separator.

7. The method of claim 6 including the step of cooling said thermal seal subsequent to said application of heat and pressure.

8. The method of claim 1 including the steps of:
    cooling said thermal seals subsequent to said application of heat and pressure; and
    providing adhesive intermediate said cover sheet and said one externally disposed current collector.

9. The method of claim 8 wherein said adhesive is applied to one surface of said cover sheet prior to said placement thereof.

10. The method of claim 2 wherein said cover sheet material is glassine.

11. A method for constructing flat multicell batteries comprising the steps of:
    providing a continuous carrier sheet of electrically insulative and dimensionally stable material;
    fixedly placing initial discrete current collector components of said flat batteries upon said carrier sheet in a manner providing a substantially regular spacing intermediate adjacent ones of said components, said current collector components including at least one metallic surface;
    placing upon each said initial current collector a multicell pile defining predetermined sequence of electrolyte, anode and cathode materials in association with discrete electrically conductive sheet-type polymeric intercell connectors, sheet separators and a second discrete current collector component having an externally disposed metallic surface, each said separator being dimensioned having an outer periphery extending beyond the corresponding peripheries of said intercell connectors and supporting a thermally activatable seal material situate and extending from said outer periphery inwardly a select distance to define a frame-type seal area;
    placing cover sheet material, dimensionally stable at temperatures whereat said seal material and said polymeric connectors are dimensionally unstable, over said externally disposed surface of said second current collector, said cover sheet being adapted to transmit heat substantially only in a transverse direction and extending at least coextensively over the said outer peripheries of said separators; and
    thermally activating said separator supported seal material by applying heat and pressure against said cover sheet over an area thereof substantially coextensive the portions of said separators supporting said seal material.

12. The method of claim 11 including the step of cooling said thermally activated seal material by contacting the surface of said cover sheet with means defining a heat sink.

13. The method of claim 11 including the step of providing adhesive intermediate said cover sheet and said second current collector.

14. The method of claim 11 wherein said cover sheet is dimensioned coextensive said separators and at least three peripherally disposed edges of said second current collector.

15. The method of claim 13 wherein said adhesive is applied to a surface of said cover sheet prior to said placement thereof.

16. The method of claim 11 in which said cover sheet is a thin, hard paper made from well-beaten chemical wood pulp.

17. The method of claim 11 wherein said cover sheet is applied as a continuous strip over said pile assemblies and said carrier sheet.

18. The method of claim 17 including the step of severing said carrier strip and said cover sheet intermediate said adjacent ones of said initial current collector components.

19. The method of claim 11 wherein:
    said cover sheet is dimensioned coextensive said separators and at last three peripherally disposed edges of said second current collector; and
    said cover sheet is a thin, hard paper made from well-beaten wood pulp.

20. The method of claim 19 including the step of cooling said thermally actived seal material by contacting the surface of said cover sheet with means defining a heat sink.

21. The method of claim 20 wherein:
    said cover sheet is applied as a continuous strip over said pile assemblies and said carrier sheet; and
    including the step of severing said carrier strip and said cover sheet intermediate said adjacent ones of said initial current collector components.

22. The method of claim 11 wherein said cover sheet is transparent.

23. The method of claim 11 wherein said cover sheet is opaque.

* * * * *